(12) United States Patent
Gurumoorthy et al.

(10) Patent No.: US 8,132,267 B2
(45) Date of Patent: Mar. 6, 2012

(54) APPARATUS AND METHOD TO HARDEN COMPUTER SYSTEM

(75) Inventors: Naga Gurumoorthy, Portland, OR (US); Arvind Kumar, Beaverton, OR (US); Matthew J Parker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 12/286,352

(22) Filed: Sep. 30, 2008

(65) Prior Publication Data

US 2010/0082961 A1  Apr. 1, 2010

(51) Int. Cl.
*G06F 11/00* (2006.01)
(52) U.S. Cl. .............................. 726/34; 713/2
(58) Field of Classification Search ...... 713/2, 189–194; 726/34, 16
See application file for complete search history.

(56) References Cited

U.S. PATENT DOCUMENTS

| | | | |
|---|---|---|---|
| 6,275,933 B1 * | 8/2001 | Fine et al. ......................... | 713/2 |
| 7,100,036 B2 * | 8/2006 | Schwartz .......................... | 713/2 |
| 7,207,039 B2 * | 4/2007 | Komarla et al. ................. | 717/178 |
| 7,392,371 B2 * | 6/2008 | Zimmer et al. .................. | 713/1 |
| 7,493,460 B2 * | 2/2009 | Zimmer et al. .................. | 711/166 |
| 7,594,104 B2 * | 9/2009 | Dale et al. ........................ | 713/2 |
| 7,757,098 B2 * | 7/2010 | Brannock et al. ............... | 713/187 |
| 7,779,273 B2 * | 8/2010 | Dale et al. ...................... | 713/189 |
| 7,783,886 B2 * | 8/2010 | Walmsley ...................... | 713/176 |
| 7,822,979 B2 * | 10/2010 | Mittal ........................... | 713/164 |
| 7,940,932 B2 * | 5/2011 | Paksoy et al. ................. | 380/247 |
| 2007/0192824 A1 | 8/2007 | Frank et al. | |
| 2008/0229092 A1 * | 9/2008 | Dale et al. ........................ | 713/2 |
| 2008/0250250 A1 * | 10/2008 | Westerinen et al. .......... | 713/189 |
| 2011/0154032 A1 * | 6/2011 | Mauro, II ...................... | 713/165 |

OTHER PUBLICATIONS

Office Action for related Chinese Application, 200910204981.0. Mailing date Oct. 18, 2011. 16 pages total, including 10 pages of English translation.

* cited by examiner

*Primary Examiner* — Krisna Lim
(74) *Attorney, Agent, or Firm* — Jordan IP Law, PC

(57) ABSTRACT

In some embodiments, a processor-based system may include a processor, the processor having a processor identification, one or more electronic components coupled to the processor, at least one of the electronic components having a component identification, and a hardware security component coupled to the processor and the electronic component. The hardware security component may include a secure non-volatile memory and a controller. The controller may be configured to receive the processor identification from the processor, receive the at least one component identification from the one or more electronic components, and determine if a boot of the processor-based system is a provisioning boot of the processor-based system. If the boot is determined to be the provisioning boot, the controller may be configured to store a security code in the secure non-volatile memory, wherein the security code is based on the processor identification and the at least one component identification. Other embodiments are disclosed and claimed.

20 Claims, 6 Drawing Sheets

APPARATUS AND METHOD TO HARDEN COMPUTER SYSTEM

The invention relates to hardened computer systems. More particularly, some embodiments of the invention relate to an apparatus and method for deterring theft or unauthorized use of a computer system or computer system components.

BACKGROUND AND RELATED ART

Some electronic systems may be provided to users on a lease or contract basis. For example, a user may receive the electronic system before the system is completely paid for. While most users will honor the terms of the lease or contract, it may be beneficial to discourage the theft of components or services before the system is paid up. This discouragement of theft or improper tampering with the system may be referred to as hardening.

For example, an electronic system may benefit from hardening against hacking the system, taking components from the system (e.g. for selling in the grey market or using in other systems), switching providers before the contract is fulfilled, and/or cheating the provider by fudging the amount of time used, among other things.

For example, some electronic systems may be hardened by soldering down components (e.g. the processor, chipset, and/or memory components), providing limited expandability (e.g. no PCI slots), using tamper proof screws, using a sealed chassis, employing intrusion detection sensors, using a 6 to 8 layer motherboard (e.g. to cover the traces), and/or epoxying the motherboard surfaces. A problem with these techniques is that they add cost to the manufacturing process (thus increasing the burden on the end users who end up paying more) and they penalize the majority of the users (who are legal, ethical) by limiting the system's capacity and expandability (e.g. the users who are paying in full or have finished the terms of the contract may have limited upgrade ability).

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
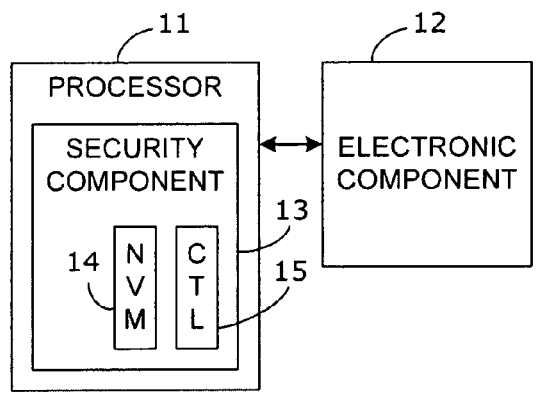
FIG. 1 is a block diagram of a processor-based system in accordance with some embodiments of the invention.

With reference to FIG. 1, a processor-based system may include a processor 11, the processor having a processor identification, one or more electronic components 12 coupled to the processor, at least one of the electronic components having a component identification, and a hardware security component 13 coupled to the processor 11 and the electronic component 12. Example of processor-based systems include but are not limited to desktop computers, laptop computers, nettop computers, netbook computers, mobile internet devices (MIDs), and gaming devices, among numerous other electronic systems.

For example, the electronic components may include at least one of a chipset component, a memory component, and an input/output device. For example, the hardware security component 13 may include a secure non-volatile memory (NVM) 14 and a controller 15. For example, the controller 15 may be configured to receive the processor identification from the processor, receive the at least one component identification from the one or more electronic components, and determine if a boot of the processor-based system is a provisioning boot of the processor-based system. If the boot is determined to be the provisioning boot, the controller 15 may be configured to store a security code in the secure non-volatile memory 14, wherein the security code is based on the processor identification and the at least one component identification.

If the boot is not determined to be the provisioning boot the controller 15 may be configured to determine a platform code based on the processor identification and the at least one component identification, and determine if the platform code is valid based on a comparison with the security code stored in the secure non-volatile memory 14. If the platform code is determined to be valid, the controller 15 may be configured to proceed to boot the processor-based system. If the platform code is not determined to be valid, the controller 15 may be configured to discontinue the boot of the processor-based system.

For example, in some embodiments of the invention if the platform code is not determined to be valid, information may be stored in the secure non-volatile memory related to the boot attempt. The disabled system may later be inspected for the boot attempt information. For example, in some embodiments of the processor-based system the controller 15 may be further configured to determine if a communication channel is present. If the communication channel is determined to be present and if the platform code is not determined to be valid, the controller 15 may send a report over the communication channel (e.g. to notify a service provider of a potential problem with the system). For example, the communication channel may be a network connection (e.g. an Ethernet connection or a WiFi connection). For example, the communication channel may be a telephone connection (e.g. a modem or a cell phone connection).

For example, in some embodiments of the processor-based system the controller 15 may be further configured to determine if the platform code needs to be validated based on information stored in the secure non-volatile memory 14. If the platform code is determined to not need to be validated, the controller 15 may proceed to boot the processor-based system (e.g. without running the validation process). For example, after the system is paid up or after the lease or contract is fulfilled, the system may no longer need to be validated and the user may upgrade the system or change components without any involvement of the original service provider.

For example, in some embodiments of the processor-based system, the hardware security component 13 may be integrated with the processor 11 in a same package as the processor 11. For example, the secure non-volatile memory 14 may also be integrated with the hardware security component 13 and the processor 11 in a same integrated circuit package as the hardware security component 13 and the processor 11. For example, the hardware security component 13 and/or the secure NVM 14 may be formed on a same integrated circuit die as the processor 11. For example, the secure NVM 14 may be an internal ROM such as an electrically erasable programmable read only memory (EEPROM) or other type of internally accessible persistent storage circuit (e.g. but externally inaccessible).

In some embodiments, the hardware security component 13 may utilize portions of the processor 11 to implement some or all of the hardware security component 13 functionality. For example, the processor 11 may include its own secure non-volatile memory 14 which may be shared with the hardware security component 13. For example, the processor 11 may be programmed with firmware to perform the controller 15 functions of the hardware security component 13 upon power on of the processor 11.

Figure 2:
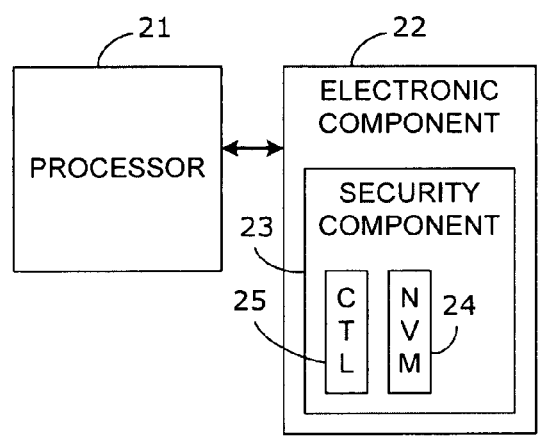
FIG. 2 is a block diagram of another processor-based system in accordance with some embodiments of the invention.

With reference to FIG. 2, a processor-based system in accordance with some embodiments of the invention is configured similarly to the processor-based system of FIG. 1, except the hardware security component 23 (including the secure NVM 24 and controller 25) is more tightly coupled to the electronic component 22 instead of the processor 21. For example, hardware security component 23 may be integrated with one of the electronic components 22 in a same package as the electronic component 22. For example, the secure non-volatile memory 24 may also be integrated with the hardware security component 23 and the electronic component 22 in a same integrated circuit package as the hardware security component 23 and the electronic component 22. For example, in some embodiments the electronic component 22 integrated with the hardware security component 23 and/or the secure NVM 24 may be a chipset component. For example, the hardware security component 23 and/or the secure NVM 24 may be formed on a same integrated circuit die as the electronic component 22. In some embodiments, the hardware security component 23 may utilize portions of the electronic component 22 to implement some or all of the hardware security component 23 functionality.

Figure 3:
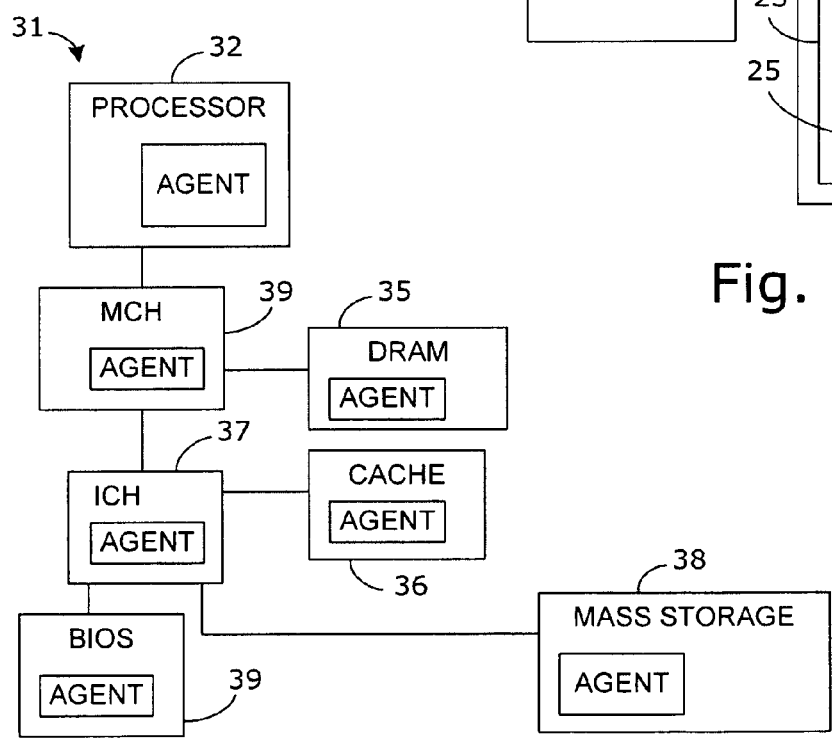
FIG. 3 is a block diagram of another processor-based system in accordance with some embodiments of the invention.

With reference to FIG. 3, a processor-based system 31 may include a processor 32, a system memory 35 coupled to the processor 32, a mass storage device 38, and a cache memory 36. For example, the processor 32 may be a central processing unit (CPU). For example, the system memory 35 may be a dynamic random access memory (DRAM). For example, the system memory 35 may be coupled to the processor 32 via a memory controller hub (MCH) 34. For example, the mass storage device 38 may be a rotating media such as a hard disk drive or an optical disk drive. For example, the mass storage device 38 may be a non-rotating media such as a solid-state drive. For example, both the cache 36 and the mass storage device 38 may be coupled to the MCH via an input/output controller hub (ICH) 37. For example, the cache 36 may include a non-volatile memory (NVM).

The processor-based system 31 may further include code stored on the processor-based system 31 to cause the processor-based system 31 to implement a hardware security agent in the processor 32. For example, the code may be stored on the mass storage device 38, the system memory 35, or another memory or storage device coupled to the processor-based system 31. For example, the code may be stored as part of a basic input/output system (BIOS) 39 coupled to the ICH 37. Preferably, the code may be stored in a secure non-volatile memory in the processor 32.

For example, the processor 32 may have a unique processor identification one or more of the MCH 34, DRAM 35, cache 36, ICH 37, mass storage device 38, and BIOS 39 components may have an associated unique component identification. Other components may be coupled to the processor 32 including, for example, a graphics component, a display component, an input/output component, a network component, a global positioning system (GPS) component, and a cellular communication component, among numerous other electronic components which may find utility in an electronic system. For example, upon provisioning the processor-based system the security agent in the processor 32 may generate a security code using the processor identification and the component identifications from each of the components coupled to the processor 32 which has an associated component identification.

On subsequent boots of the processor-based system 31, the security agent in the processor 32 may generate a platform code based on the processor identification and the available component identifications. By comparing the newly generated platform code with the previously stored security code stored in the secure non-volatile memory, the security agent may determine if the system has been altered after the prior provisioning. If the system has been altered, the security agent may halt the boot and/or attempt to send the service provider a notification over the network or through another available communication channel.

In accordance with some embodiments of the invention, one or more of the components coupled to the processor 32 may also have their own security agent in addition to the security agent in the processor 32. For example, each of the processor 32, the MCH 34, the DRAM 35, the cache 36, the ICH 37, the mass storage 38, and the BIOS 39 may have an associated security agent (e.g. in a same integrated circuit package and/or formed on a same integrated circuit die as the associated device). For example, the security agent may include a secure NVM which stores a unique identifier for the associated device. For example, during a provisioning boot each of the components that has a security agent may go through the process of gathering information (e.g. the unique identifiers) from the connected components, generating a security code based on the gathered information, and storing the security code in an internal, secure NVM on the associated device. For example, during a subsequent boot each of the components that has a security agent may go through the process of validating itself in the current platform and disabling itself if the validation fails.

Each device with its own security agent may individually disable itself if the device is placed in an unauthorized system.

Advantageously, by rendering more devices useless if removed some embodiments of the invention increase the hardening of the system. Each device that is disabled may have little value on the grey market value and may further discourage rogue users. The processor-based system 31 and/or the processor 32 and individual components may further include an administrative mode or alternate security code which is known, for example, to the OEM/ODM to restore the system and/or components to an operating state or to re-provision the platform. For example, the platform may be re-provisioned if during the term of a service contract the user purchases additional components or upgrades from the service provider. In some embodiments, such re-provisioning may be performed in a secure manner over a network connection (e.g. the internet), such that a user may purchase and upgrade online, install it themselves, and then authorize the new components with an automated process provided by the service provider.

Figure 4:
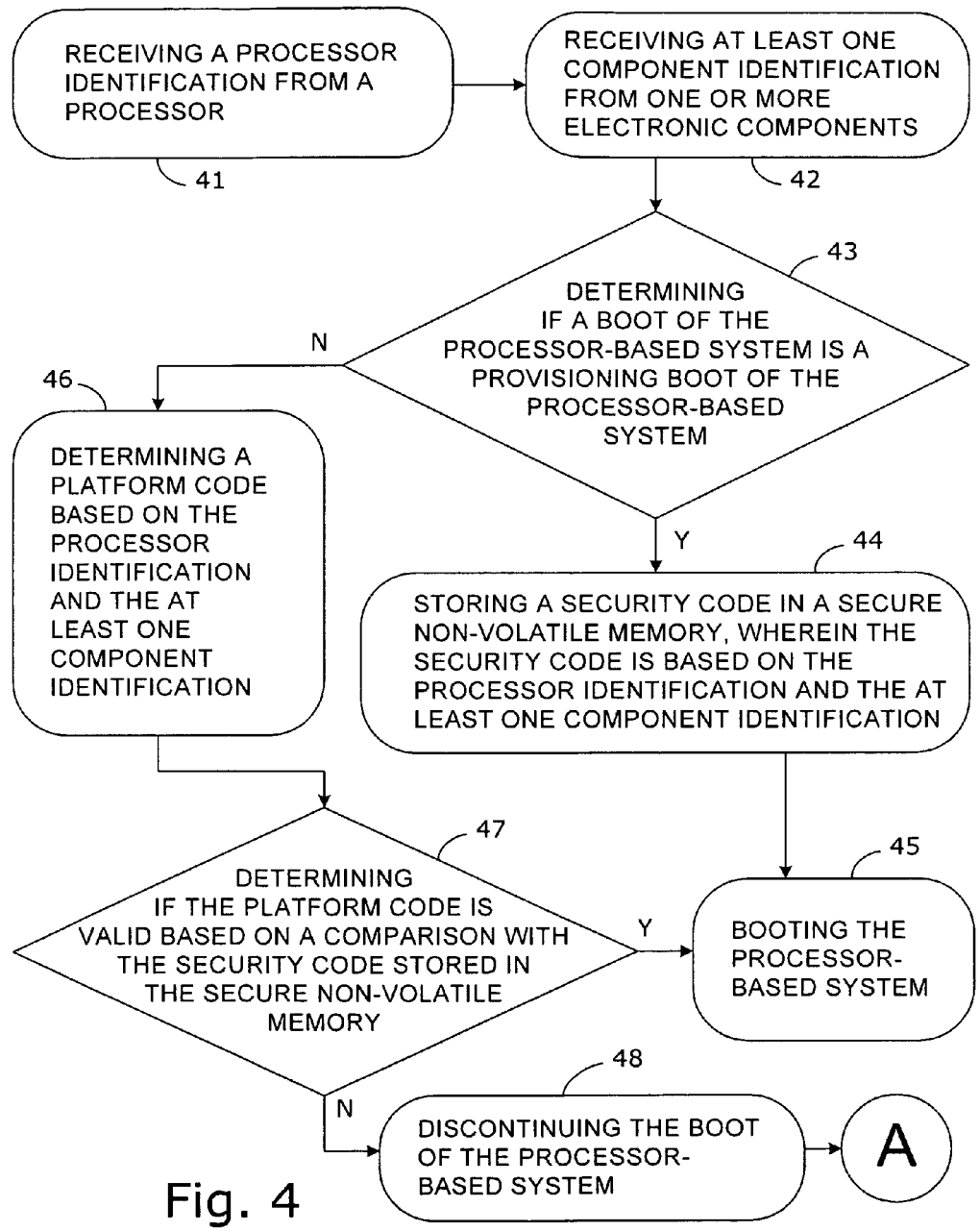
FIG. 4 is a flow diagram in accordance with some embodiments of the invention.

With reference to FIG. 4, in accordance with some embodiments of the invention utilizing a processor-based system may include receiving a processor identification from a processor (e.g. at block 41), receiving at least one component identification from one or more electronic components (e.g. at block 42), determining if a boot of the processor-based system is a provisioning boot of the processor-based system (e.g. at block 43), if the boot is determined to be the provisioning boot, storing a security code in a secure non-volatile memory, wherein the security code is based on the processor identification and the at least one component identification (e.g. at block 44), and booting the processor-based system (e.g. at block 45).

If the boot is not determined to be the provisioning boot, some embodiments of the invention may further include determining a platform code based on the processor identification and the at least one component identification (e.g. at block 46), determining if the platform code is valid based on a comparison with the security code stored in the secure non-volatile memory (e.g. at block 47), if the platform code is determined to be valid, booting the processor-based system (e.g. at block 45), and if the platform code is not determined to be valid, discontinuing the boot of the processor-based system (e.g. at block 48).

Figure 5:
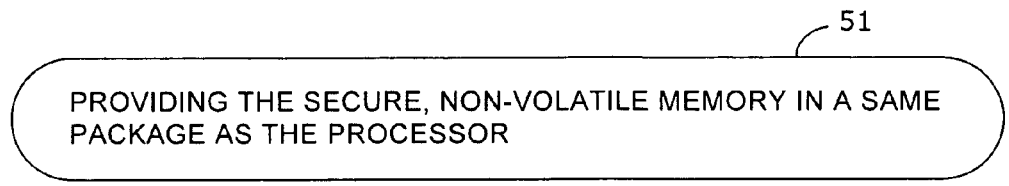
FIG. 5 is another flow diagram in accordance with some embodiments of the invention.
Figure 6:
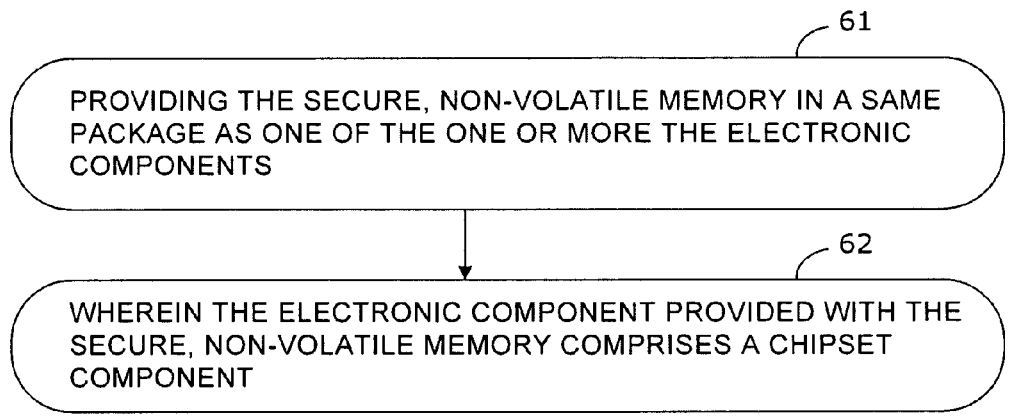
FIG. 6 is another flow diagram in accordance with some embodiments of the invention.
Figure 7:
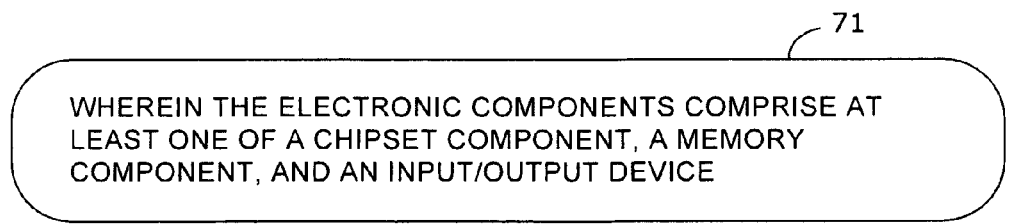
FIG. 7 is another flow diagram in accordance with some embodiments of the invention.

With reference to FIGS. 5-7, some embodiments of the invention may further include providing the secure non-volatile memory in a same package as the processor (e.g. at block 51). Some embodiments of the invention may further include providing the secure non-volatile memory in a same package as one of the one or more the electronic components (e.g. at block 61). For example, the electronic component provided with the secure non-volatile memory may be a chipset component (e.g. at block 62). For example, in some embodiments of the invention the electronic components may include at least one of a chipset component, a memory component, and an input/output device (e.g. at block 71).

Figure 8:
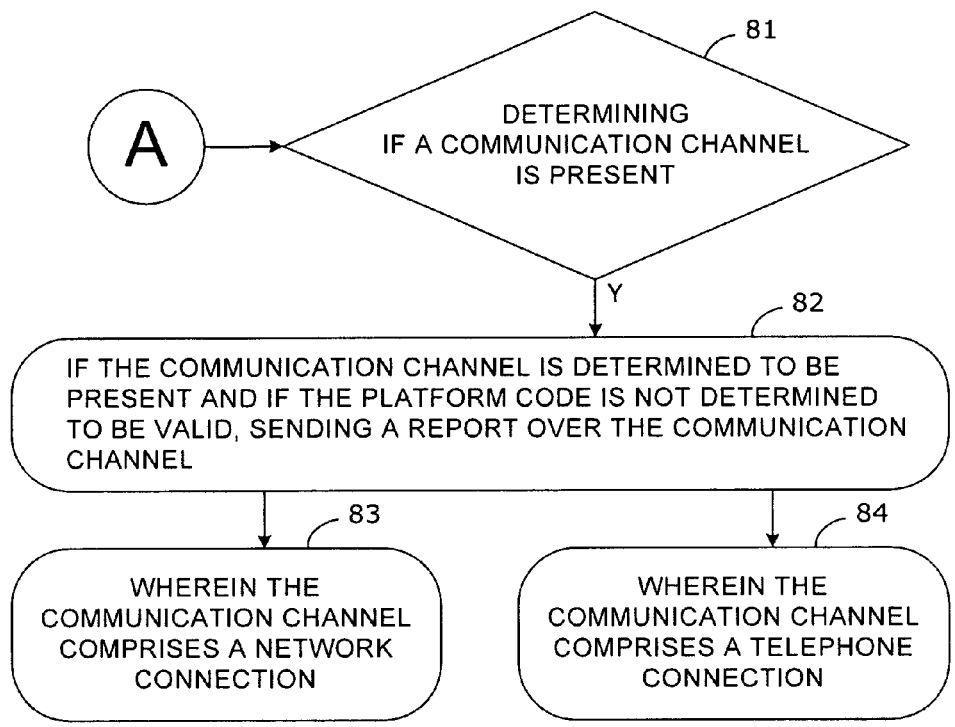
FIG. 8 is another flow diagram in accordance with some embodiments of the invention.

With reference to FIG. 8, some embodiments of the invention may further include determining if a communication channel is present (e.g. at block 81) and if the communication channel is determined to be present and if the platform code is not determined to be valid, sending a report over the communication channel (e.g. at block 82). For example, the communication channel may include a network connection (e.g. at block 83). For example, the communication channel may include a telephone connection (e.g. at block 84).

Figure 9:
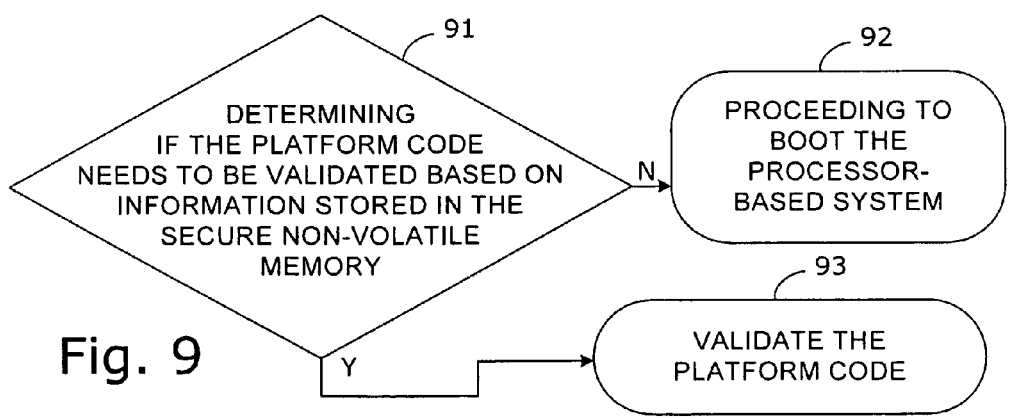
FIG. 9 is another flow diagram in accordance with some embodiments of the invention.

With reference to FIG. 9, some embodiments of the invention may further include determining if the platform code needs to be validated based on information stored in the secure non-volatile memory (e.g. at block 91), and if the platform code is determined to not need to be validated, proceeding to boot the processor-based system (e.g. at block 92). If the platform code is determined to need to be validated, some embodiments of the invention include proceeding to validate the platform code (e.g. at block 93).

For example, some embodiments of the invention may find utility in electronic systems which are provided to end users under a contract or service plan. For example, a pay-as-you-go financing business model similar to those presently used for cell phones and smart phones may make other electronic systems more affordable for new users who may have a desire to use a particular electronic system but cannot afford the payment up front. For example, partners in the pay-as-you-go business model may include financial institutions (banks), and internet service providers (ISPs). One specific example of this business model is the Microsoft FlexGo™ initiative.

A prepaid business model may be a specific subset of the pay-as-you-go model where the end user pays the provider upfront for certain amount of time (e.g. like cell phone minutes). The user can use the device for the specified amount of time at the end of which the device will not be operable until the user buys more time. After a certain number of hours used (e.g. a certain amount of payment), the device may become the user's possession.

A subscription model is another subset of the pay-as-you-go model where the end user agrees to a service contract with the provider (e.g. a monthly payment for an agreed to period of time). When the user fulfills the terms of the service contract, the device may become the user's possession.

Advantageously, some embodiments of the invention may support the pay-as-you-go model by making the model more attractive for both the business partners and the end users. For example, by hardening the system with the hardware security agent instead of the physical security measures, cost is reduced for the business partners and this cost saving may be passed along to the end users. Some embodiments of the invention will discourage rogue users from taking parts off a the device which is hardened (as described herein) and selling it or using it in another computer because the parts may be inoperable in other systems (and the original system may become inoperable if altered). Advantageously for the end users, their device may be upgraded (e.g. with an authorized upgrade during the contract or after they fulfill the terms of the contract with the service provider). For example, the user may be able to upgrade the processor, add memory, add I/O cards, or otherwise modify their system.

Some embodiments of the invention may include of a mix of hardware (HW) and firmware (FW) components. The HW may be realized as a micro-controller similar to, for example, a Manageability Engine (ME) in various Intel Corporation chipset products. For example, some embodiments of the invention may be implemented in the micro-code of the CPU. If the CPU gets improperly plugged into a different system, some embodiments of the invention will ensure the processor halts, rendering the system useless.

For example, a system may be built at an original equipment manufacturer (OEM) or original design manufacturer (ODM) with a specific processor, chipset, dual in-line memory module (DIMM), flash device, and IO device(s), among other components. Either the processor or the chipset may have a micro-controller HW (Agent) and may be configured to be the first piece of HW to execute (e.g. even before the host CPU core comes up during the normal boot process). The Agent may have some amount of secure read-only memory (ROM) that is not accessible to anyone outside this piece of HW. The ROM may at least a write-once ROM.

Before the system is provided to the end user, the system undergoes an initial provisioning. For example, the first boot after the system is assembled, tested and ready for packaging and delivery to the end user, the Agent may detect that it is the first boot and start the provisioning process. For example, the provisioning process may include detecting the platform components and their IDs, generating a unique platform ID based on their combination, and storing it securely.

For example, the Agent may execute a secure firmware application (App). The code of the App may be retrieved from a secure storage (e.g. an encrypted flash or an internal ROM) and may be authenticated with some standard security mechanisms. The App may gather the processor ID, chipset ID, memory ID (e.g. from a serial presence detect (SPD)), firmware hub (FWH) ID, IDs of the IO devices, and any other IDs from components which have IDs. All of the gathered IDs may be concatenated in a unique way to form the Platform ID. The different OEM/ODMs can choose their own way of generating this platform ID code. The unique platform ID code may also be encrypted using standard algorithms (e.g. chosen by the ODM/OEM) and stored in the secure ROM within the chipset (or processor).

For example, on subsequent boots the Agent may retrieve the platform ID from the secure storage and retrieve all of the available component IDs of the system. The Agent may transfer control to the boot firmware if all the OEM/ODM installed components are present (e.g. the system has not been tampered with). If the same components are not present, the Agent may enter a HW locked mode and the system will not boot an OS. In some embodiments of the invention, a critical error may be logged in the secure storage and if a network connection is present the service provider may be alerted.

For example, these checks may happen upon each reboot as long as the system is not paid for or the terms of the contract have not been fulfilled. For example, the pay-as-you-go provider (e.g. the ISP or other such entities) may use secure methods of metering and updating a flag in the secure storage to indicate if the system has been paid off in full or not. For example, when the user fulfills the terms of the service contract, a secure provisioning process from the service provider (e.g. over a network connection) may communicate with the Agent to ensure the platform ID check is not run anymore on reboots.

For example, the secure methods for the service provider may make use of the root of trust built into the hardware that will only accept a 'payment made' changes from a trusted OEM, whose certificate is registered on the system, and the request is duly signed by private key. For example, upon validating that the information is from a trusted OEM, the system may further make sure that the information includes valid request indicating 'payment' for all the features enabled. Additional vendors (e.g. for IO or add-in cards) may incorporate similar checks in a local secure storage (e.g. an option ROM). Advantageously, providing an add-in card with an ID and/or its own security agent may help ensure that the add-in cards will work only on the system they were meant for.

Figure 10:
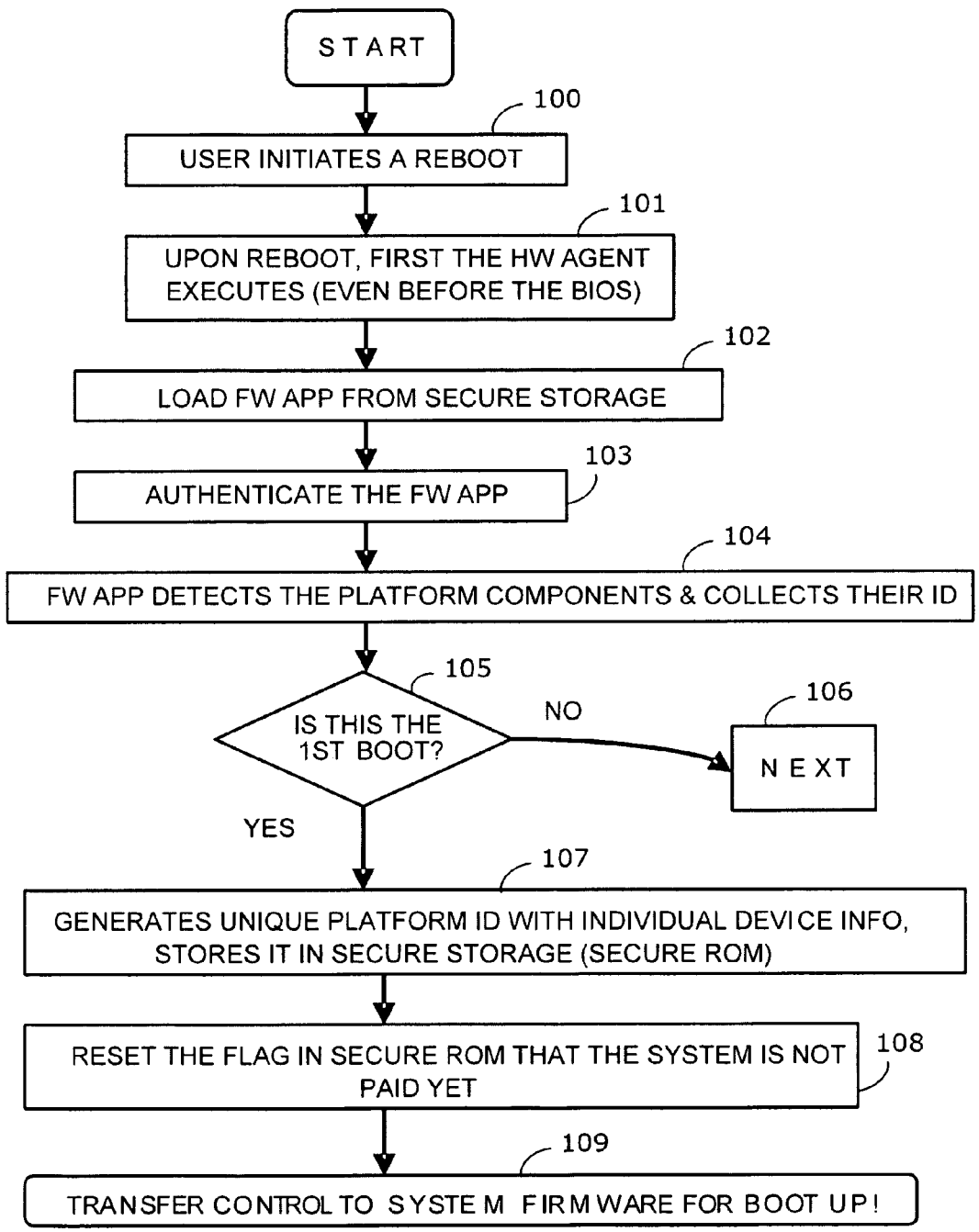
FIG. 10 is another flow diagram in accordance with some embodiments of the invention.

With reference to FIG. 10, some embodiments of the invention for utilizing a processor-based system include initiating a reboot (e.g. at block 100), executing a hardware agent before starting the BIOS (e.g. at block 101), loading a firmware application from secure storage with the hardware agent (e.g. at block 102), and authenticating the firmware application (e.g. at block 103). The firmware application detects the platform components and collects the available component IDs (e.g. at block 104). If the firmware application determines that this is a first boot of the platform (or an otherwise authorized provisioning boot) (e.g. at block 105), the firmware application generates a unique platform ID based on the individual device information (the component IDs) and stores the platform ID in secure storage (e.g. at block 107). The firmware application may then reset a flag in secure storage that indicates the system is not yet paid-in-full (e.g. at block 108) and transfer control to the system firmware for boot (e.g. at block 109). If the firmware application determines that the current boot is not a first boot of the platform (or otherwise not an authorized provisioning boot), the firmware application begins the next steps (e.g. at block 106).

Figure 11:
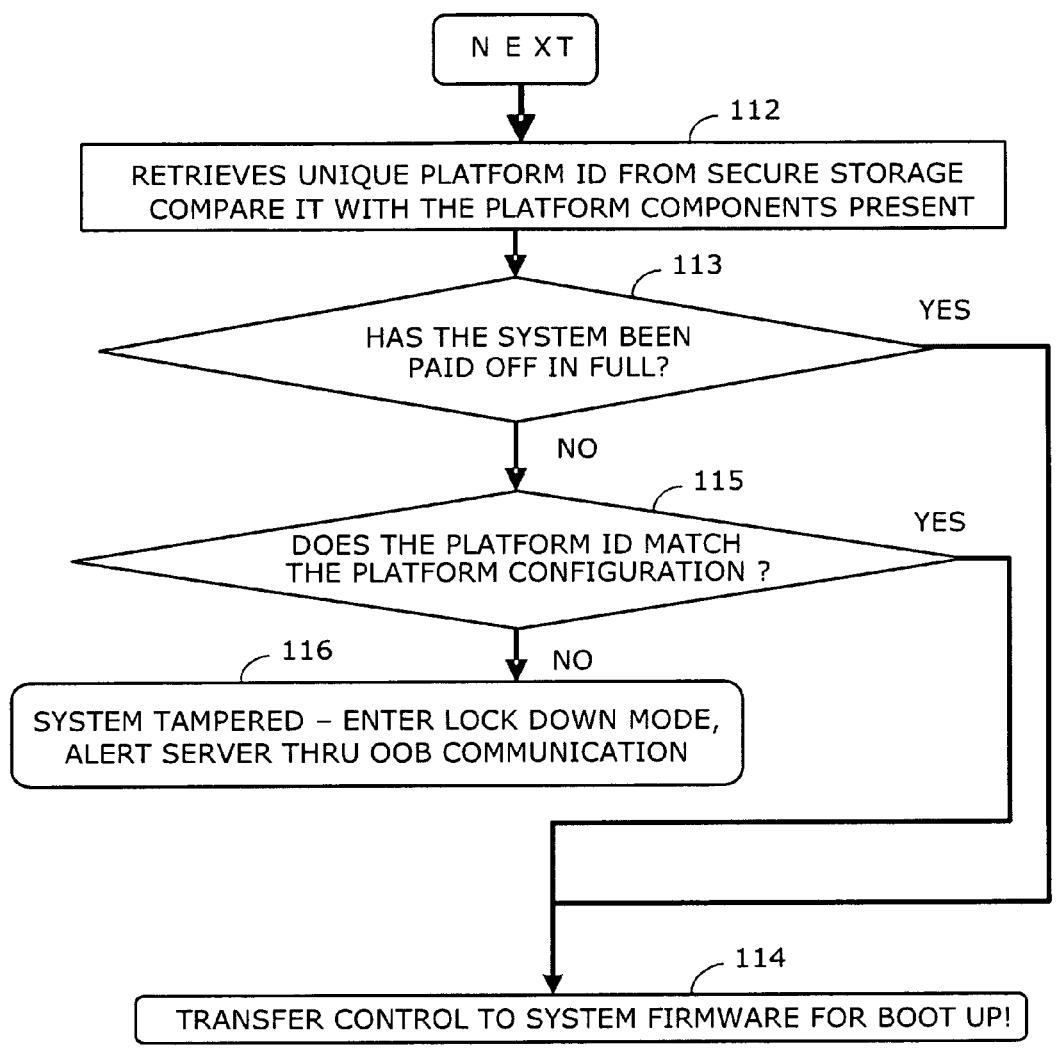
FIG. 11 is another flow diagram in accordance with some embodiments of the invention.

With reference to FIG. 11, in some embodiments of the invention the next steps may include the firmware application retrieving the unique platform ID from the secure storage and comparing the retrieved ID with the platform components present (e.g. at block 112). If the system has been paid in full (e.g. as indicated by a flag in the secure storage), the firmware application may transfer control to the system firmware for boot (e.g. at block 114) without performing further validation of the platform. If the system has not been paid in full (e.g. at block 113) but the retrieved platform ID matches the present platform configuration (e.g. at block 115), the firmware application may transfer control to the system firmware for boot (e.g. at block 114). If the system has not been paid in full (e.g. at block 113) and the retrieved platform ID does not match the present platform configuration (e.g. at block 115), the system may have been tampered with the firmware application may lock down the system and alert the server through an out-of-band (OOB) communication.

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 11 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
a processor, the processor having a processor identification;
one or more electronic components coupled to the processor, at least one of the electronic components having a component identification; and
a hardware security component coupled to the processor and the electronic component, wherein the hardware security component includes:
a secure non-volatile memory; and
a controller, wherein the controller is configured to:
receive the processor identification from the processor;
receive the at least one component identification from the one or more electronic components; and
determine if a boot of the processor-based system is a provisioning boot of the processor-based system;

if the boot is determined to be the provisioning boot, the controller is configured to store a security code in the secure non-volatile memory, wherein the security code is based on the processor identification and the at least one component identification;

if the boot is not determined to be the provisioning boot, the controller is configured to:

determine a platform code based on the processor identification and the at least one component identification;

determine if the platform code is valid based on a comparison with the security code stored in the secure non-volatile memory;

if the platform code is determined to be valid, proceed to boot the processor-based system; and if the platform code is not determined to be valid, discontinue the boot of the processor-based system.

2. The processor-based system of claim 1, wherein the hardware security component is integrated with the processor in a same package as the processor.

3. The processor-based system of claim 2, wherein the secure non-volatile memory is integrated with the hardware security component and the processor in a same package as the hardware security component and the processor.

4. The processor-based system of claim 1, wherein the hardware security component is integrated with one of the electronic components in a same package as the electronic component.

5. The processor-based system of claim 4, wherein the secure non-volatile memory is integrated with the hardware security component and the electronic component in a same package as the hardware security component and the electronic component.

6. The processor-based system of claim 5, wherein the electronic component integrated with the hardware security component and the secure non-volatile memory comprises a chipset component.

7. The processor-based system of claim 1, wherein the electronic components comprise at least one of a chipset component, a memory component, and an input/output device.

8. The processor-based system of claim 1, wherein the controller is further configured to:

determine if a communication channel is present; and if the network connection is determined to be present and if the platform code is not determined to be valid, send a report over the communication channel.

9. The processor-based system of claim 8, wherein the communication channel comprises a network connection.

10. The processor-based system of claim 8, wherein the communication channel comprises a telephone connection.

11. The processor-based system of claim 1, wherein the controller is further configured to:

determine if the platform code needs to be validated based on information stored in the secure non-volatile memory; and if the platform code is determined to not need to be validated, proceed to boot the processor-based system.

12. A method of utilizing a processor-based system, comprising:

receiving a processor identification from a processor;

receiving at least one component identification from one or more electronic components;

determining if a boot of the processor-based system is a provisioning boot of the processor-based system;

if the boot is determined to be the provisioning boot, storing a security code in a secure non-volatile memory, wherein the security code is based on the processor identification and the at least one component identification; and if the boot is not determined to be the provisioning boot:

determining a platform code based on the processor identification and the at least one component identification;

determining if the platform code is valid based on a comparison with the security code stored in the secure non-volatile memory;

if the platform code is determined to be valid, booting the processor-based system; and if the platform code is not determined to be valid, discontinuing the boot of the processor-based system.

13. The method of claim 12, further comprising:
providing the secure non-volatile memory in a same package as the processor.

14. The method of claim 12, further comprising:
providing the secure non-volatile memory in a same package as one of the one or more the electronic components.

15. The method of claim 14, wherein the electronic component provided with the secure non-volatile memory comprises a chipset component.

16. The method of claim 12, wherein the electronic components comprise at least one of a chipset component, a memory component, and an input/output device.

17. The method of claim 12, further comprising:
determining if a communication channel is present; and
if the communication channel is determined to be present and if the platform code is not determined to be valid, sending a report over the communication channel.

18. The method of claim 16, wherein the communication channel comprises a network connection.

19. The method of claim 16, wherein the communication channel comprises a telephone connection.

20. The method of claim 12, further comprising:
determining if the platform code needs to be validated based on information stored in the secure non-volatile memory; and
if the platform code is determined to not need to be validated, proceeding to boot the processor-based system.

* * * * *